UNITED STATES PATENT OFFICE.

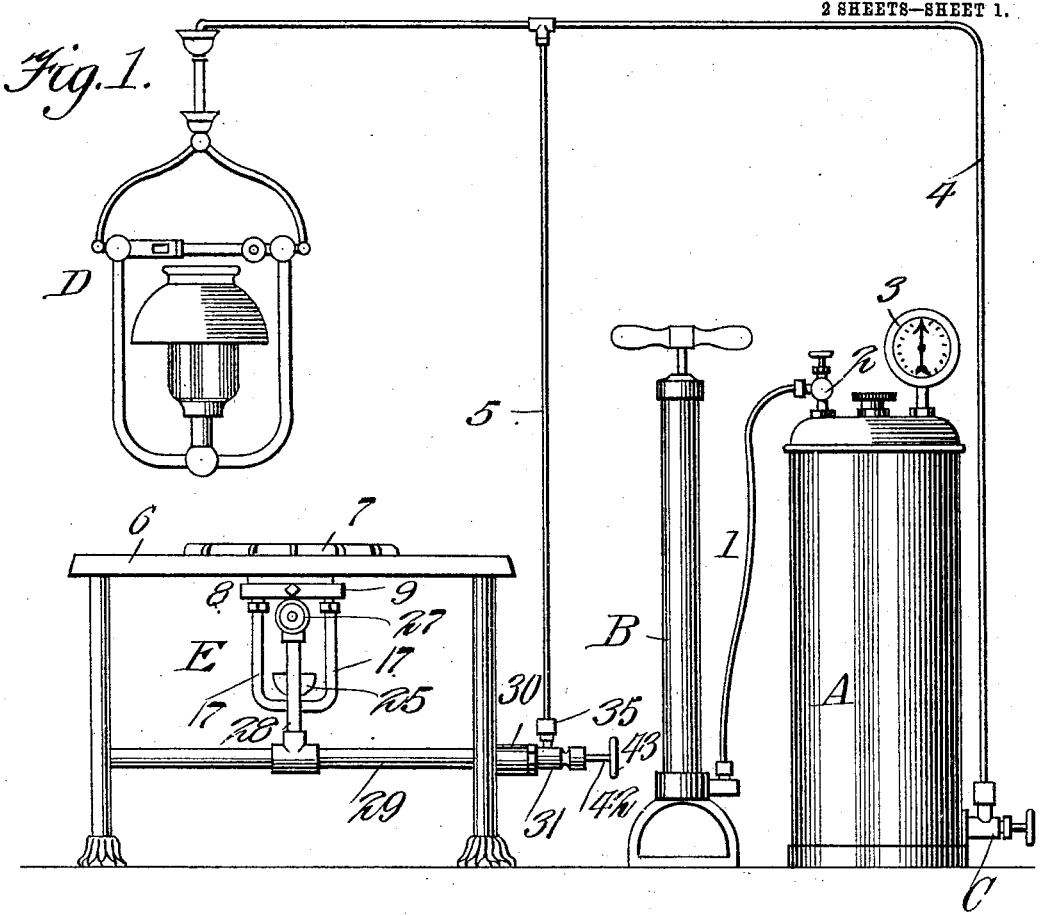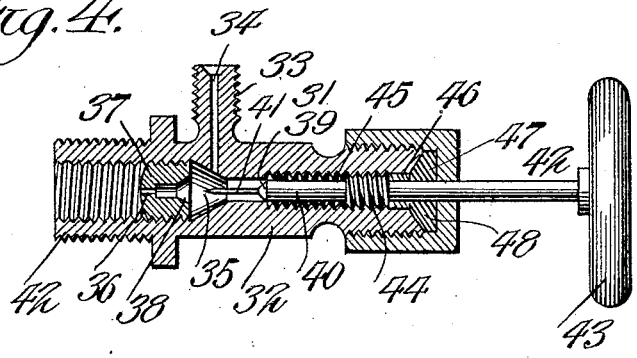

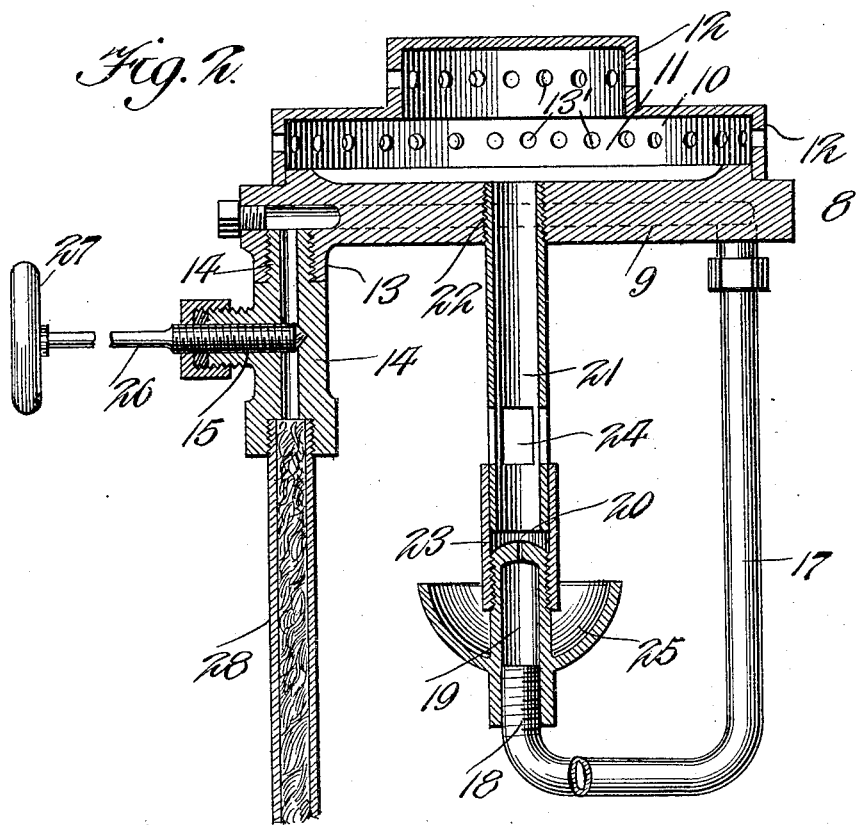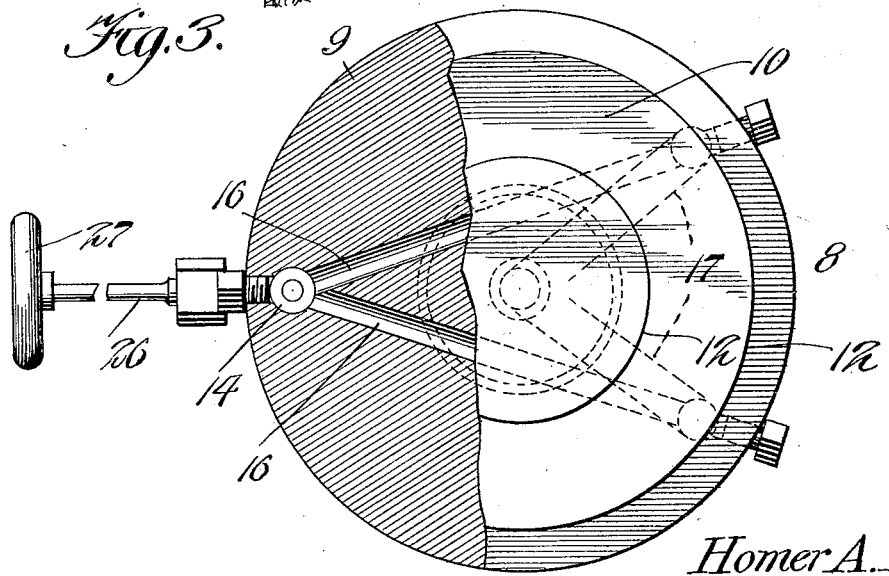

HOMER A. BARR, OF ASHLAND, PENNSYLVANIA.

COMBINED LIGHTING AND HEATING SYSTEM.

932,947.

Specification of Letters Patent.

Patented Aug. 31, 1909.

Application filed August 4, 1908. Serial No. 446,892.

*To all whom it may concern:*

Be it known that I, HOMER A. BARR, a citizen of the United States, residing at Ashland, in the county of Schuylkill and State of Pennsylvania, have invented new and useful Improvements in Combined Lighting and Heating Systems, of which the following is a specification.

This invention relates to a combined lighting and heating system of that type in which liquid fuel such as gasolene or other light hydro-carbons are employed, the fuel being vaporized at the lamps and stoves to supply the vaporized mixture to the burners thereof and the fuel being derived from a tank located outside the building as a matter of protection and maintained under suitable air pressure for forcing the fuel to the vaporizers.

The invention has for one of its objects to provide a stove attachment for an ordinary liquid fuel lighting system of the character referred to, which attachment is of comparatively simple and inexpensive construction, thoroughly reliable and efficient in use, and readily manipulated.

Another object of the invention is the provision of a stove designed for use in connection with liquid hydro-carbon and consisting of a novel arrangement of vaporizer and burner body, vapor-conducting conduit, Bunsen tube, starting cup, liquid supply pipe, and controlling valve therefor.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a diagrammatic view of the combined lighting and heating system. Fig. 2 is a vertical section of the stove burner. Fig. 3 is a top plan view thereof with portions of the vaporizing disk in section. Fig. 4 is a longitudinal sectional view of the liquid fuel controlling valve of the stove.

Similar reference characters are employed to designate corresponding parts throughout the views.

Referring to the drawings, A designates the fuel tank of the system which is preferably located outside of the building equipped with lighting and heating apparatus, the tank being air-tight and the fuel therein is normally maintained under air pressure by means of a hand pump B and connected therewith by a pipe 1 which has a hand-controlled valve 2 at the top of the tank which is open when the pump is to be used, there being a pressure gage 3 on the tank for indicating the head on the liquid fuel. At the bottom of the tank is a needle valve C that controls the flow of liquid fuel to the service pipe 4 which is usually a copper tube of about one-eighth inch diameter so that there will be comparatively little fuel stored in the service pipe in order to minimize danger in case of fire. This pipe is distributed throughout the building equipped with the system and at appropriate points has connected therewith suitable lamps D, the lamps being of that type capable of converging the liquid fuel into vapor for the purpose of producing a vapor mixture to be supplied to the burner or mantle thereof.

The attachment comprises a stove E which is connected by a branch pipe 5 with the service pipe 4 to receive liquid fuel from the lighting service. The stove E comprises a frame 6 formed with a grate or spider 7 on which a cooking utensil is adapted to rest. Under the part 7 is arranged a burner body 8 constructed to produce a blue flame. The burner body consists of a horizontal disk 9 preferably in the form of a metal casting and on which is a hood 10 that coöperates with the disk 9 to form a mixture chamber 11, the cylindrical walls 12 of the hood being provided with apertures 13′ through which the gas mixture issues from the chamber to burn around the outside of the hood. On the disk 9 is a depending hollow boss 13 into which is secured the threaded end or casing 14 for the controlling valve 15.

The disk is formed with one or more passages 16 that are bored in the disk in such a position as to communicate with the boss 13 or with the valve casing 14 to receive liquid hydro-carbon therefrom, the said passages constituting vaporizers wherein the liquid hydro-carbon is converted into vapor. The passages terminate at points adjacent the periphery thereof and at the side opposite from the boss 13 and discharge into vertical vapor-conducting tubes 17 that have their lower ends united and formed into a vertically-extending exteriorly threaded stem 18 disposed axially below the disk 9. On this threaded stem 18 is screwed a nipple 19 that has a fine jet opening 20 in its crown through which a jet of vapor passes into the Bunsen tube 21. The tube 21 has its upper end exteriorly threaded to screw into a central opening 22 in the disk 9 for connecting the tube with the latter to deliver combustible mixture to the burner body from the Bunsen tube. The nozzle 19 has its upper end exteriorly threaded for connection with a sleeve 23 that embraces the lower end of the Bunsen tube, and by vertically adjusting the sleeve the effective area of the air inlet opening 24 can be regulated for controlling the proportions of air and gas. On the nipple 19 is formed a cup 25 for receiving alcohol, gasolene and the like, which is to be ignited for initially heating the vaporizer in the starting of the stove. The flame rises from the starting cup, strikes the vaporizer or disk 9 and effectively heats the same so that when the valve 15 is opened, liquid fuel supplied to the vaporizer will be converted into vapor and thence be conducted by the pipes 17 to the nozzle. The jet of vapor passing from the nozzle opening through the tube 21 will draw in air through the openings 24 and the air and vapor are effectively mixed in the chamber 11 so that an intense and large blue flame will be produced around the burner hood. The flame-regulating valve 15 has an elongated stem 26 that terminates at the outside of the stove and is equipped with a hand wheel so as to be conveniently manipulated.

Connected with the bottom side of the valve casing 14 is a vertical pipe 28 that is connected with a horizontal pipe 29 suitably mounted on the stove, the first-mentioned pipe being filled with asbestos or the like for preventing pulsation and insuring an even flow of liquid fuel to the vaporizer. The outer end of the pipe 29 is connected by a coupling sleeve 30 to a valve 31 that connects with the branch pipe 5. The valve 31 comprises, as shown in Fig. 4, a casing 32 which is formed with a boss or extension 33 provided with a fine bore 34 that communicates with the pipe 5, the pipe being connected with the extension by a nut 35, Fig. 1. The bore 34 discharges into a chamber 35 in the casing 32 and from this point the liquid fuel passes into the pipe 29 through a jet-opening 36 in the plug 37, there being a valve seat 38 formed on the plug with which the inner conical end 39 of the valve 40 engages when the supply of liquid fuel is entirely cut off. On the inner end of the valve 40 is a needle 41 that is adapted to enter the jet opening 36 for cleaning the same and prevent sediment from lodging therein. The casing has an extension 42 that is interiorly threaded for receiving the plug 37 and is exteriorly threaded for receiving the coupling 30 that connects the valve casing with the pipe 29.

The valve 40 is provided with a stem 42 that passes outwardly through the casing and is equipped with a hand wheel 43, the stem being threaded at 44 to engage the threads of the bore 45 in the casing, whereby the rotary movement of the stem will move the valve back and forth. In the outer end of the bore 45 is a bushing 46 through which the valve stem passes and with which the threaded portion 44 of the stem is adapted to engage when the valve is fully opened, the bushing serving as a stop for limiting the opening movement of the valve. The stem passes through a packing ring 47 that bears against the bushing and which is compressed by a gland nut 48. When the system is to be used for lighting alone, the fuel valve 31 is closed by manipulating the hand wheel 43 so that liquid fuel will not leak out of the stove burner.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim is:—

1. The combination of a liquid fuel tank, means for maintaining the same under air pressure, a service pipe, a stove, and a valve connecting the stove with the service pipe, the said stove comprising a vaporizer, a pipe connecting the valve with the vaporizer, a vapor-conducting conduit connected with the vaporizer and disposed under the same, a mixing chamber arranged over the vaporizer, a nozzle on the discharge end of the conduit and having an exterior thread on its upper end, a Bunsen tube extending between the nozzle and mixing chamber, and a sleeve threaded on the nozzle and loosely embracing the Bunsen tube to move up and down thereon by the turning of the sleeve on the nozzle for varying the inlet opening of the latter.

2. A stove of the class described comprising a supporting frame, a liquid fuel supply pipe mounted thereon, a valve attached to the extremity of the said pipe, a burner body consisting of a disk and a hood coöperating with and disposed over the disk to form a mixing chamber, said disk having a central opening and also a passage communicating with the valve to receive liquid fuel therefrom and forming a vaporizer, a conduit connected with the passage and extending downwardly from and supported on the disk and having an upwardly-extending return at its lower end, a nozzle threaded on the said end, a Bunsen tube supported solely on the disk having its upper end threaded in the opening thereof and depending therefrom and positioned directly over the nozzle with its lower end terminating short of the latter to conduct the vapor to the mixing chamber, and a sleeve secured to the nozzle and telescoping on the Bunsen tube to vary the inlet opening of the latter.

3. In a stove of the class described, the combination of a disk having a hollow depending boss adjacent one side and vaporizing passages communicating with the boss and extending to the opposite side of the disk, means connected with the boss for delivering liquid fuel to both passages, vapor-conducting tubes connected with the opposite ends of the passages and disposed under the disk, the lower end of the said tubes being united and provided with an upwardly-threaded stem, a nozzle screwed on the stem, an external thread on the upper end of the nozzle, a cup arranged on the nozzle, a Bunsen tube disposed vertically above the nozzle and having its upper end threaded in an opening of the said disk, a sleeve screwed on the upper end of the nozzle and adjustable for varying the air in the opening of the Bunsen tube, a hood on the disk coöperating therewith to form a mixing chamber, the walls of the hood being provided with jet apertures, and a valve controlling the supply of liquid fuel to the vaporizing passages.

In testimony whereof I affix my signature in presence of two witnesses.

HOMER A. BARR.

Witnesses:
NATHAN A. BARR,
JOSEPH SEILIG.